Jan. 1, 1952 L. D. FUNK 2,580,755
SOIL FUMIGATING APPARATUS
Filed Dec. 12, 1947 3 Sheets-Sheet 1
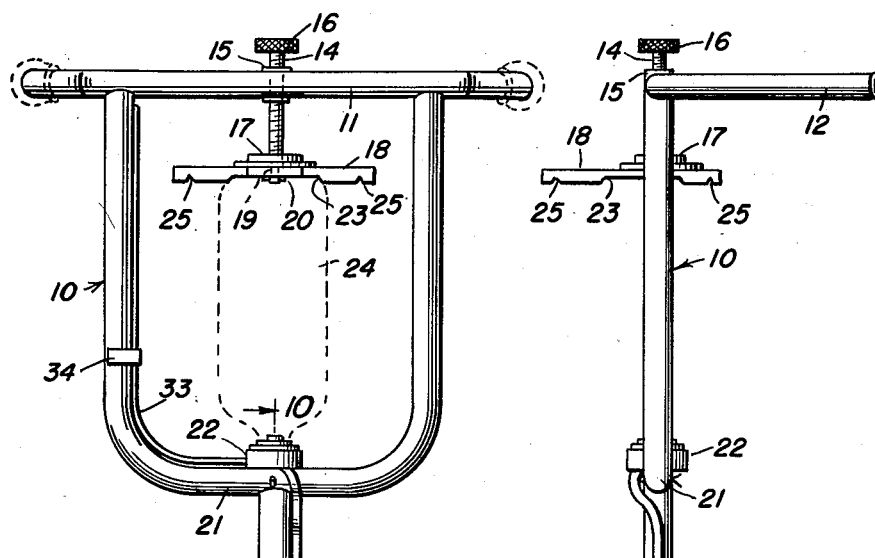
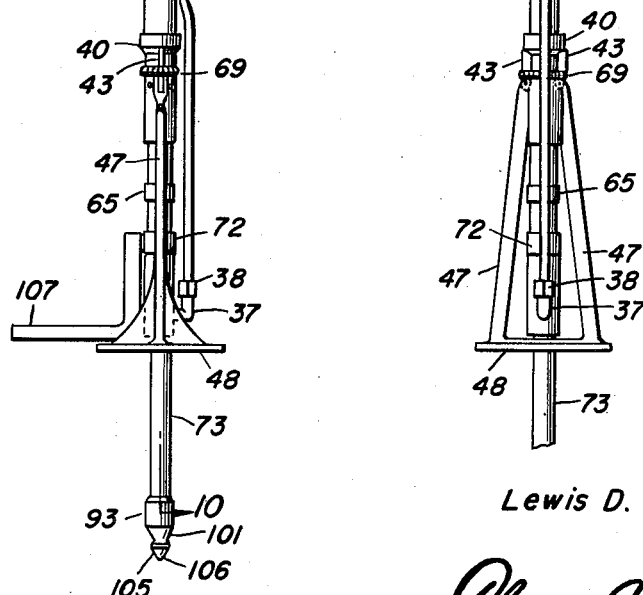
Inventor
Lewis D. Funk
By Clarence A. O'Brien
and Harvey B. Jacobson
Attorneys Jan. 1, 1952  L. D. FUNK  2,580,755
SOIL FUMIGATING APPARATUS
Filed Dec. 12, 1947  3 Sheets-Sheet 2
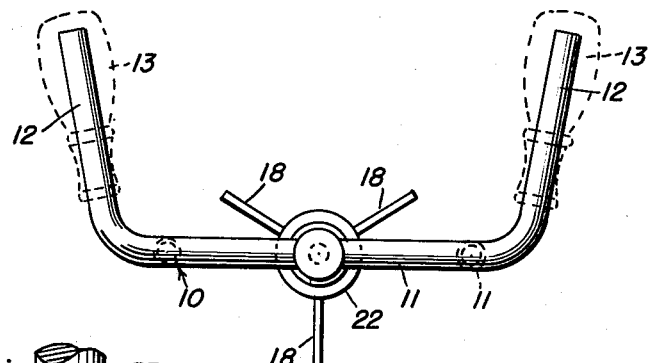
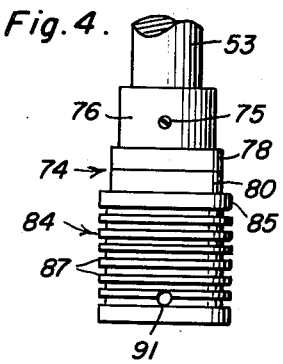
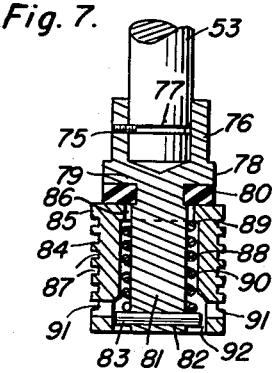
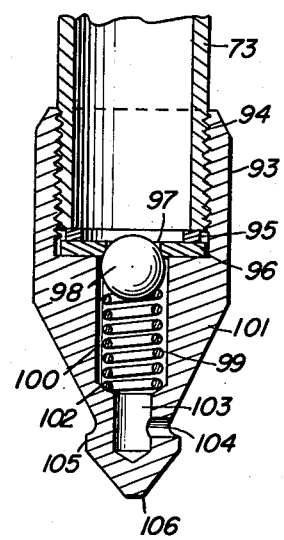
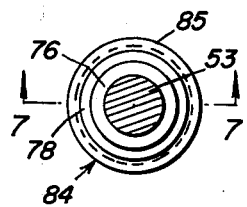
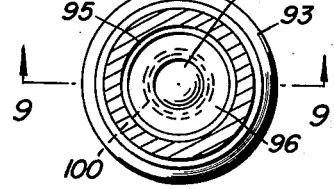
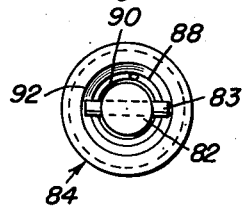
Inventor
Lewis D. Funk
By Clarence A. O'Brien
and Harvey B. Jacobson
Attorneys Jan. 1, 1952 — L. D. FUNK — 2,580,755
SOIL FUMIGATING APPARATUS
Filed Dec. 12, 1947 — 3 Sheets-Sheet 3
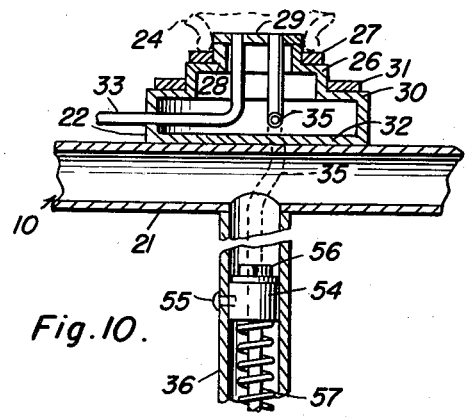
Fig. 10.
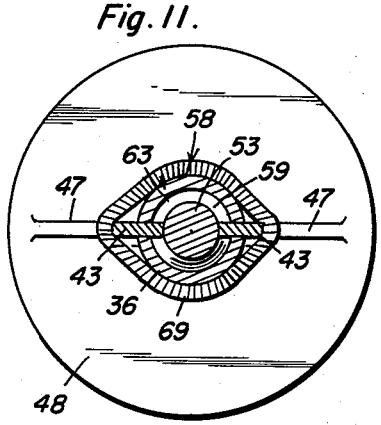
Fig. 11.
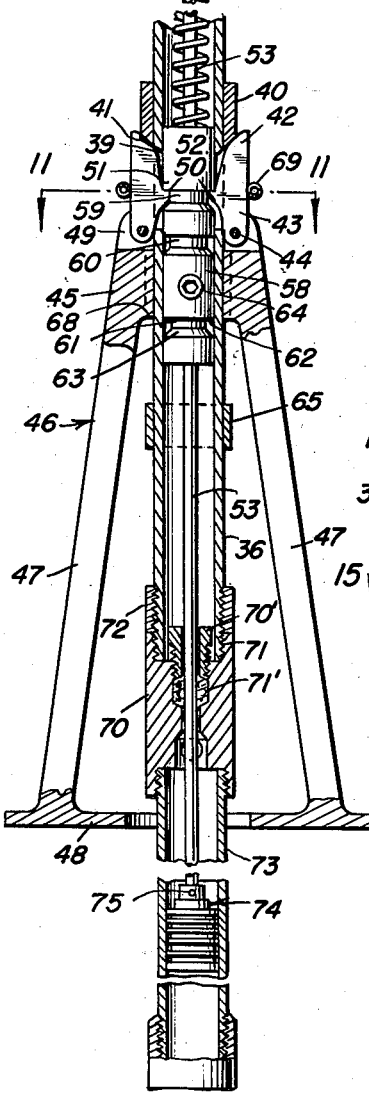
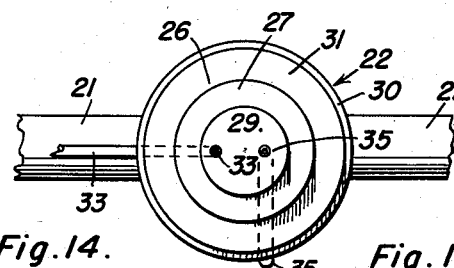
Fig. 12.
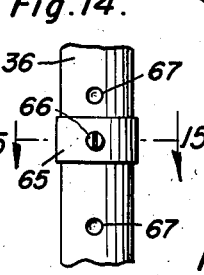
Fig. 14.
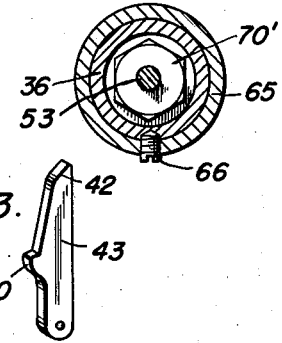
Fig. 15.
Fig. 13.
Inventor
Lewis D. Funk
By Clarence A. O'Brien
and Harvey B. Jacobson
Attorneys Patented Jan. 1, 1952

2,580,755

UNITED STATES PATENT OFFICE 2,580,755

SOIL FUMIGATING APPARATUS

Lewis D. Funk, Whittier, Calif., assignor of one-half to Paul Greening, Norwalk, Calif.

Application December 12, 1947, Serial No. 791,285

5 Claims. (Cl. 111—7.4)

This invention relates to a pump or gun for applying a soil fumigant beneath the surface of the soil, for killing ground or insect pests as well as fungi and bacteria living in the soil, although it is to be understood that the same may be used with equal facility for applying liquid fertilizers, disinfectants and the like.

The object of the invention is to provide a novel pump or gun to be operated by hand and foot power, for applying or forcing under pressure, the fumigant after the nozzle thereof has been forced into the soil, and to prevent clogging of the nozzle.

Another object of the invention is to provide a novel and simple gun or pump of the character stated which is provided with handle bars by which the operator will grasp the same and force the nozzle from which the fumigant or other liquid is ejected into the soil, and upon operation thereof, to force any desired or given quantity of the fumigant or other liquid into the soil for the treatment thereof or for killing pests or the like as stated.

A still further object of the invention is to provide a gun or pump which will hold a container which may vary in size, in an inverted position in order to discharge the contents thereof into the pump or feeding mechanism by which the same is forced under pressure into the soil, the device being especially constructed with reference to the adaptor for holding jars of different sizes which may be effectively clamped in position to feed the liquid fumigant into the pump valve in order that it may be displaced and forced through a nozzle of the pump into the soil, and including a cocking disc which operates a spring loading device and rests on the top of the soil as the nozzle is pushed about six inches into the soil, so that when the foot bar is operated, the pump is reciprocated so that the piston thereof, will force a measured quantity of the fumigant or other liquid through the nozzle to spread into the soil for the purposes stated.

Other objects and advantages reside in the details of construction and operation as more fully hereinafter described and claimed, reference being had to the accompanying drawings forming part hereof, wherein like numerals refer to like parts throughout, and in which:

Figure 1 is a front elevation of a fumigant gun or pump constructed in accordance with the invention;

Figure 2 is a side elevation of the device with the lower end thereof broken away;

Figure 3 is a top plan view of the upper portion of the device, the operating disk being omitted;

Figure 4 is a detailed fragmentary elevation of the pump piston;

Figure 5 is a top plan view of the structure shown in Figure 4;

Figure 6 is a bottom view of the lower end of the pump piston;

Figure 7 is a fragmentary longitudinal sectional view of the pump piston taken on the section line 7—7 of Figure 5;

Figure 8 is an enlarged view looking at the top of the nozzle;

Figure 9 is a fragmentary sectional view showing the nozzle attached to the lower end of the pump body or tube;

Figure 10 is a longitudinal sectional view of the pump taken on the line 10—10 of Figure 1;

Figure 11 is a sectional view taken on the line 11—11 of Figure 10;

Figure 12 is a top plan view of the structure shown in Figure 10 showing the adaptor for the jars of fumigant liquid;

Figure 13 is a perspective view of a release dog employed in connection with the device;

Figure 14 is a fragmentary side elevation showing an adjustable stop or ring on the body or cylinder to regulate the amount of fluid to be fed into and discharged by the pump, and;

Figure 15 is a sectional view taken on the line 15—15 of Figure 14.

Referring to the drawings in detail, the pump or gun is shown as comprising a frame including a U-shaped upper tubular member 10 in the form of a U or yoke having a cross handle or top brace 11 across the top and connecting the upper ends thereof in the form of handle bars similar to a bicycle or motorcycle having the angularly bent ends 12 provided with hand grips 13. Intermediately, a clamping screw 14 is threaded through a sleeve 15 constituting a bearing therefor vertically in the cross bar or brace 11 and provided with a knurled operating head 16. The lower end of the screw 14 has swivelled thereto as indicated at 17, a container clamp or spider 18 consisting of a channel bar or otherwise through which the lower unthreaded end of the screw 14 extends, as indicated at 19 and is provided with a hole transversely therethrough to receive a retaining means such as a cotter pin 20. The intermediate portion of the yoke or U-shaped frame member 10 indicated at 21, supports a container adaptor 22 beneath the container clamp or spider 18 which may have three or more arms as shown in Figure 3 and is provided with a seat or recess 23 for taking a quart container jar for the fumigant liquid or other suitable treating fluid as indicated at 24, and is further provided outwardly thereof with notches 25 at the bottom edges of the arms for taking a gallon bottle, jar or container. In order to accommodate such bottles or jars at the adaptor 22 with the open end or neck thereof downwardly to empty the contents by gravity, the adaptor 22 is constructed as shown in Figure 10 of the drawings and as also illustrated in plan in Figure 12, with a smaller seat 26 bearing a gasket 27 or other suitable packing against which the jar neck fits over the reduced upper portion of the adaptor indicated at 28 and which is tubular or open at the top to be closed by a cap plate or disc 29. The adaptor is of stepped formation or successively smaller in diameter toward the top and below the seat or shoulder 26, is provided with a larger seat or shoulder 30 receiving a packing washer or gasket 31 to form a seal with the large mouth of a gallon container or jar which fits over the portion 29, the bottom 32 of the adaptor being welded or otherwise attached to the bight portion 21 of the handle bar yoke frame 10. An air vent tube 33 extends through the lateral wall of the lower portion of the adaptor and up through the cap 29 vertically through an aperture in the latter, for permitting air to enter the container, bottle or jar to displace the liquid therein, and this tube curves around the inside of the frame 10 at one side thereof where it may be held by a clip 34 and extends to near the top of the frame beneath the cross bar or handle bar 11 above the top of the bottle or jar. Another tube or feeder line 35 also extends through an aperture or opening in the cap or closure 29 and at its lower end, is offset laterally to extend through the bottom 32 of the adaptor at one side of the frame 10 at the yoke portion bight 21 and along side a tubular body or cylinder 36 secured centrally to the bight portion 21 as indicated in Figures 1 and 10, to near the bottom of the pump or gun, where it connects to an elbow 37 leading into the cylinder 73 through the medium of a coupling nipple 38. The tubular body or cylinder 36 is provided with a pair of diametrically opposite slots 39 a considerable distance down on the same and is provided above the slot with a release collar, tapered bushing or sleeve 40, the lower edge of which is bevelled as shown at 41 so as to engage the bevelled top edges 42 of release dogs 43, which are pivoted at their lower ends as indicated at 44 to the upper end portion 45 of a frame or cage 46 having legs 47 connected at their lower ends to an operating or cocking disc in the form of a plate 48 adapted to engage the ground when the pump nozzle is forced into the same as will be later described. The upper end of the frame 46 above the tubular portion 45 is provided with apertured ears 49 through which the release dogs 43 are pivoted as at 44 and these dogs are provided with intermediate projections 50 extending inwardly providing top seats adapted to engage beneath a shoulder 51 provided at the lower end of a piston head 52 secured on a piston or sucker rod 53 or movable thereon if desired and operating through a collar 54 secured in the upper portion of the body or cylinder 36 as by means of a set screw 55. A washer and a nut 56 are mounted on the upper end of the piston rod 53 which as before stated operates through the sleeve or collar 54, and a coil spring 57 is disposed around the piston rod 53 between the collar 54 and the head 52, to hold the latter downwardly while permitting upward movement of the upper end of the piston rod through the collar 54 at the nut and washer 56 which latter limits the downward movement of the piston rod with respect to the collar 54 which is secured against movement in the body or cylinder 36 as described. The head 52 constitutes the upper portion of an index sleeve 58 between the upper end of which and the collar 54, the spring 57 is disposed to exert downward force on the index sleeve, which latter is provided with a plurality of annular recesses 59, 60 and 61 in its periphery with right angled top shoulders 62 and bevelled lower ends 63 for measuring a given quantity or volume of fluid to be drawn into the cylinder and injected by the pump, the upper recess being used for one-half teaspoon full or other desired quantity, the next groove or recess 60 being used for a teaspoonful, and the lower recess 61 for two teaspoonsful of the fluid, although this may be varied according to the capacity desired. It should therefore be noted that the lower recess 61 is spaced a greater distance from the groove 60 than the latter is from the groove or recess 59 and the index sleeve is secured in position by a set screw such as a socket head screw 64 along the piston or sucker rod 53, by which it is made adjustable according to the volume of fluid to be discharged. An adjustable stop collar 65 is held by a set screw 66 which is adapted to engage any one of three holes 67 through the cylinder 36 at its lower portion beneath the sleeve portion 45 at the top of the frame 46, said adjustable stop limiting the upward movement of the cylinder or downward movement of the frame with respect thereto by engagement with the shoulder 68 at the bottom of the sleeve 45. Incidentally, the dogs 43 are shown in Figure 10 engaged in the index sleeve at the groove 59 at the point of tripping by the bevelled edge 41 engaging the bevelled edges 42 of the dogs 43. A spring 69 encircles the dogs 43 for holding the latter in contact with the lift or index sleeve and into the grooves therein. A barrel 70 is threaded or otherwise coupled to the lower end of the cylinder 36 as indicated at 71, and the cylinder also receives a threaded adjustment ring 72 to hold the connection in adjusted position and against movement with the cylinder 36 recessed or extending into a recess in the upper end of the barrel 70, preferably with a packing gland 70' having a graphite-asbestos packing 71'. Threaded in the lower end of the barrel 70 is a cylinder portion or extension 73 in which a piston 74 of the pump or gun, which is of the injector type, is positioned. This piston or piston head as shown in Figures 4 to 7 inclusive, has a socketed adaptor 76 of reduced size at its upper end, and a groove 77 in which the screw 75 is adapted to engage to couple the piston head to the piston rod 53 at its lower end. Below the adapter 76, is an annular flange 78 beneath which is a reduced portion 79 on which a suitable gasket or washer 80 of compressible material is mounted, the lower end of the piston head being reduced as indicated at 81 and provided with a transverse passage 82 at its lower portion to receive a retaining pin 83 running diametrically. A piston sleeve 84 fits loosely around the portion 81 beneath the gasket 80 and has a top flange 85 of annular form with an annular clearance space 86 between the same and the reduced portion 81 at its upper end below the gasket 80, the piston sleeve 84 being grooved peripherally as indicated at 87 and is adapted to take suitable packing if desired. Below the flange annularly around the top of the sleeve 84, the sleeve is recessed interiorly as indicated at 88 to provide a top shoulder 89 between which and the pin 83, a spring 90 is inserted to normally hold the sleeve against the gasket 80 and form an airtight joint on the down stroke, thus serving also as a valve as well as a piston. On the up stroke, the sleeve 84 moves downwardly away from the gasket 80 to provide a passage through which the fluid may escape into the cylinder 73 from the container or other fluid supply indicated by the bottle or jar 24, down through the supply tube or feed line 35 on the suction stroke of the piston upwardly, at which time it is adapted to pass out into the cylinder 73 through passages 91 at the enlarged lower recess or bore portion of the sleeve indicated at 92, which receives the end of the spring 90 and pin 83 where they project from the periphery of the portion 81 and communicate with the lower end of the sleeve, in comunication with the lower portion of the cylinder. At the lower end of the cylinder 73, the latter carries a nozzle 93 counterbored and internally threaded at the top as indicated at 94 to engage the lower threaded end of the cylinder 73 with an interposed fibre washer 95 and a check disc or valve seat 96 beneath the same at the bottom of the counterbore having a central opening 97 for engagement by a spring ball check valve 98 held normally seated by a spring 99 in a reduced counterbore 100 in the lowered tapered portion 101 of the nozzle 93. This nozzle is a clog-proof nozzle to prevent dirt collecting therein to interfere with the discharge of the liquid fumigant or other treating fluid, and is formed with a seat 102 at the bottom of the counterbore 100 with a reduced passage 103 having one or more lateral passages 104 constituting escape ducts leading through the narrow lower end of the tapered portion 101 of the nozzle, below which the point or head is enlarged as indicated at 105 and also tapered to a point as indicated at 106 for easy insertion in the soil, preferably to a depth of about six inches for injection of the fluid thereinto. A foot bar 107 of angular form as shown in Figure 1, is attached to the sleeve or ring 72 to force the device and nozzle 93 into the soil until it engages the base plate or disk 48. The nozzle 93 continues to penetrate the ground or soil while the cocking disk remains stationary on the surface of the soil. The cocking disk is fastened by legs 47 to the dog cage 46 upon which are pivoted the diametrically opposed dogs 43. The spring about the dogs normally urges them into positive engagement with a preselected groove in the index sleeve 52 so that as the nozzle 93 continues downwardly, the dogs lift the sleeve 52 which is fastened to and raises the piston rod 53. The spring 57 in the cylinder 36 interposed between the stop collar 54 and the index sleeve is, accordingly, compressed on the upstroke of the index sleeve and associated piston 74 and rod 53. As the rod 53 is being raised, it lifts the piston 74 through a column of soil fumigant located in the cylinder 73 between the piston 74 and the packing 71 in barrel 70. On the upstroke, the soil fumigant bypasses the piston by virtue of the by-pass means provided thereon as shown clearly in Figure 7. This is accomplished in the following manner. As the piston 74 continues to rise, the soil fumigant passes between the piston washer 80 and the piston sleeve 84 which has dropped approximately one-sixteenth of an inch and rests on the retaining pin 83. This action between the piston sleeve 84 and piston 74 acts as a valve permitting the soil fumigant to pass from the upper section to the lower section of cylinder 73 through piston sleeve 84.

On reaching the top of the stroke and just before the dogs 43 are released, the piston spring 90 closes the piston sleeve 84 against the washer 80, sealing off the return of the soil fumigant to the upper cylinder 73.

At the top of the charging stroke, the nozzle 93 has penetrated to approximately six inches below the cocking disk and at this point the dogs 43 have contacted the beveled or tapered sleeve bushing 40 which forces the dogs apart to release the index sleeve 52. At this point, the coil spring 57 is compressed tightly between the index sleeve 52 and the upper collar 54. When the index sleeve is released, therefore, the coil spring 57 forces the index sleeve downward. Accordingly, the piston 74 is forced downwardly helping to close the valve formed by the piston washer 80 and piston sleeve 84 which, in turn, compresses the soil fumigant located between the piston sleeve 84 and the valve seat 96. This downward movement forces the soil fumigant through the valve seat 96, past the ball check 98, past valve spring 99, through counterbore 100, into lateral passages 104, and into the soil surrounding the nozzle 93. At this point, the nozzle 93 is removed from the soil, which causes the cocking disk 48, dog cage 46, and dogs 43 to drop downwardly and to rest on the stop collar 65. In this position, the above mentioned cycle may be repeated for the next injection. Also, by adjustment of the index sleeve, the dogs 43 will be caused to engage any one of the grooves 59, 60 and 61, to vary the quantity of fluid injected into the soil as desired. Also, it is to be understood that any treating fluid may be used in the device and that the device is comparatively simple, light in weight and easily handled by a single person. In renewing the containers or bottles 24, all that is necessary is to unscrew the clamp and to insert a new jar or bottle in the adaptor 22, for continued use of the device with a new supply.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. An apparatus for injecting a fluid into the ground comprising aligned upper and lower cylinders, a nozzle on the lower end of said lower cylinder adapted to be inserted downwardly into the ground, a frame movably embracing said cylinders and having a part adapted to engage the ground and hold the frame stationary with respect to the ground when said nozzle has been inserted into the ground a predetermined amount, further insertion of said nozzle serving to provide relative movement in one direction between said frame and cylinders, an axially movable piston rod extending into both said cylinders, a collar secured in said upper cylinder and slidably receiving the upper end of said piston rod, a piston secured to the lower end of said piston rod and slidable within said lower cylinder, an index sleeve having spaced annular grooves secured to said piston rod, a spring interposed between said collar and said sleeve normally urging said sleeve and piston downwardly, locking dogs each having a free upper end and a lower end pivoted to said frame, resilient means normally urging said dogs into locking engagement with one of said grooves, conduit means for feeding fluid to the upper portion of said lower cylinder, means permitting flow of fluid through said piston to the lower portion of said lower cylinder upon movement of said piston with said sleeve and frame in said one direction, and means carried by said upper cylinder unlocking said dogs after a predetermined amount of movement in said one direction to free said sleeve and piston, whereby said piston is urged downwardly by said spring to force fluid through said nozzle.

2. An apparatus as defined in claim 1, wherein said means for unlocking said dogs includes a collar secured to said upper cylinder, said collar having a lower beveled edge which engages the upper ends of said dogs to pivot them outwardly.

3. An appaartus for injecting fluid into the ground comprising a cylinder having a lower end adapted to be inserted downwardly into the ground, a piston rod axially movable in said cylinder, a piston secured to said rod and slidable in said cylinder, an index sleeve having spaced annular grooves secured to said rod, resilient means normally urging said sleeve and piston downwardly, a frame movably embracing said cylinder, locking dogs each having a free upper end and a lower end pivoted to said frame, resilient means normally urging said dogs into locking engagement with a selected one of said grooves, insertion of said cylinder into the ground serving to provide relative movement in one direction between said frame and cylinder for moving said sleeve and piston against the urging action of said first-mentioned resilient means, and means unlocking said dogs after a predetermined amount of movement in said one direction to free said sleeve and piston for urging action downwardly by said first-mentioned resilient means.

4. An apparatus as defined in claim 3, wherein said first-mentioned resilient means includes a collar fixed in said cylinder and a spring interposed between said collar and said index sleeve.

5. An apparatus as defined in claim 3, wherein said means for unlocking said dogs includes a collar secured to said cylinder, said last-mentioned collar having a lower beveled edge which engages the upper ends of said dogs.

LEWIS D. FUNK.

REFERENCES CITED

The following references are of record in the file of this patent:

UNITED STATES PATENTS

| Number | Name | Date |
|---|---|---|
| 1,120,065 | Larson | Dec. 8, 1914 |
| 2,435,647 | Engseth | Feb. 10, 1948 |

FOREIGN PATENTS

| Number | Country | Date |
|---|---|---|
| 42,710 | Denmark | Aug. 4, 1930 |
| 58,220 | Norway | July 26, 1937 |
| 73,011 | Austria | Jan. 25, 1917 |
| 96,554 | Austria | Apr. 10, 1924 |